United States Patent
Schmogrow et al.

(10) Patent No.: US 10,404,376 B2
(45) Date of Patent: Sep. 3, 2019

(54) SYSTEMS AND METHODS OF ANALYZING AN OPTICAL TRANSPORT NETWORK

(71) Applicant: Google LLC, Mountain View, CA (US)

(72) Inventors: Rene Schmogrow, San Jose, CA (US); Vinayak Dangui, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/039,038

(22) Filed: Jul. 18, 2018

(65) Prior Publication Data

US 2019/0215073 A1    Jul. 11, 2019

Related U.S. Application Data

(60) Provisional application No. 62/614,021, filed on Jan. 5, 2018.

(51) Int. Cl.
| | |
|---|---|
| *H04B 10/291* | (2013.01) |
| *H04B 10/079* | (2013.01) |
| *H04J 14/02* | (2006.01) |
| *H04B 10/2543* | (2013.01) |

(52) U.S. Cl.
CPC ... *H04B 10/2916* (2013.01); *H04B 10/07953* (2013.01); *H04B 10/07955* (2013.01); *H04B 10/2543* (2013.01); *H04J 14/02* (2013.01)

(58) Field of Classification Search
None
See application file for complete search history.

(56) References Cited

U.S. PATENT DOCUMENTS

| | | | | |
|---|---|---|---|---|
| 2002/0060827 | A1* | 5/2002 | Agazzi | G11B 20/10009 398/158 |
| 2005/0090989 | A1* | 4/2005 | Kelly | G01V 1/28 702/14 |
| 2009/0164159 | A1* | 6/2009 | Thompson | G01R 29/26 702/69 |
| 2013/0251222 | A1* | 9/2013 | Huang | A61B 8/13 382/131 |

(Continued)

FOREIGN PATENT DOCUMENTS

EP    2723004 A1    4/2014

OTHER PUBLICATIONS

International Search Report and Written Opinion dated Apr. 1, 2019 in International (PCT) Application No. PCT/US2019/012407.

*Primary Examiner* — Darren E Wolf
(74) *Attorney, Agent, or Firm* — McDermott Will & Emery LLP (57) ABSTRACT

A system for analyzing an optical transport network is provided. The system can generate a linear OSNR and an output power profile for each optical link element of an optical link based on an input power profile, amplifier characteristics, transport fiber characteristics, and a set of operating parameters. The system can generate a nonlinear OSNR for each optical link element based on the input power profile and transport fiber characteristics of each optical link element. The system can determine an expected performance metric for the optical link based on the linear OSNR, the non-linear OSNR, and a transmitter output OSNR. The system can designate the optical link as valid for use in the optical transport network if the expected performance metric is greater than or equal to a performance metric threshold.

24 Claims, 4 Drawing Sheets

(56) References Cited

U.S. PATENT DOCUMENTS

| | | |
|---|---|---|
| 2015/0010300 A1 | 1/2015 | Fan et al. |
| 2016/0191194 A1 | 6/2016 | Wood et al. |
| 2016/0308619 A1* | 10/2016 | Ling .................... H04B 10/564 |
| 2017/0012709 A1* | 1/2017 | Duthel ................. H04B 10/278 |
| 2017/0134089 A1 | 5/2017 | Mansouri Rad et al. |

* cited by examiner

SYSTEMS AND METHODS OF ANALYZING AN OPTICAL TRANSPORT NETWORK

RELATED APPLICATIONS

The present application claims priority to, and the benefit of, U.S. Provisional Patent Application No. 62/614,021, titled "APPARATUS AND MECHANISM FOR SIMULATING AND DESIGNING AN OPTICAL TRANSPORT NETWORK" and filed on Jan. 5, 2018, the entire contents of which are hereby incorporated by reference for all purposes.

BACKGROUND

Optical transport networks are capable of providing extremely high bandwidth for transmission of data. Today, optical transport networks are responsible for transmitting a significant portion of all human and machine generated information. For example, optical transport networks enable modern internet and communication networks. Optical transport networks may transmit this information through a plurality of optical links, or "paths." In some cases, an optical link may experience failure due to faults in the optical links. In the event of link failure, traffic on the failed optical link can be rerouted to a different optical link.

SUMMARY

At least one aspect of the present disclosure is directed towards a method of analyzing an optical transport network. The method includes generating a linear optical signal-to-noise ratio (OSNR) and an output power profile for each optical link element of an optical link based on an input power profile, amplifier characteristics, transport fiber characteristics, and a set of operating parameters associated with each optical link element. The output power profile represents the input power profile of a next optical link element of the optical link. The method includes generating a non-linear OSNR for each optical link element based on the input power profile and transport fiber characteristics of each optical link element. The method includes determining an expected performance metric for the optical link based on the linear OSNR, the non-linear OSNR, and a transmitter output OSNR. The method includes designating the optical link as valid for use in the optical transport network based on determining that the expected performance metric is greater than or equal to a performance metric threshold.

In some implementations, generating the non-linear OSNR further includes using a split-step Fourier propagator. In some implementations, generating the non-linear OSNR further includes using a Volterra series propagator. In some implementations, generating the non-linear OSNR includes using a split-step Fourier propagator to simulate a reference run and using a Volterra series propagator to compute the non-linear OSNR based on the reference run.

In some implementations, each optical link element includes an amplifier and an optical fiber. In some implementations, the set of operating parameters includes an amplifier type and a launch power value, and the amplifier characteristics include a gain and a noise figure of the amplifier. In some implementations, the amplifier characteristics include at least one reference Raman gain value for an input signal wavelength, wherein the reference Raman gain value is a function of fiber type, span unit loss, and pump point loss. In some implementations, the transport fiber characteristics include attenuation as a function of frequency, Raman gain coefficient as a function of difference in frequency, chromatic dispersion, chromatic dispersion slope, and a nonlinear coefficient.

In some implementations, the method includes calculating the set of operating parameters based on a span length and a unit loss of an optical link element. In some implementations, the method includes calculating the set of operating parameters by: computing an effective OSNR for a plurality of potential design rule sets, and selecting the potential design rule set associated with a highest effective OSNR.

In some implementations, the expected performance metric includes an effective OSNR and the performance threshold metric includes a required OSNR. In some implementations, the effective OSNR includes at least one of an OSNR contributed by a transmitter, an OSNR contributed by an amplifier, an OSNR contributed by a receiver, and an OSNR contributed by a transmission impairment. In some implementations, the expected performance metric is a sum of inverses of the linear OSNR, the non-linear OSNR, a transmitter OSNR of a transmitter connected to the optical link, and a receiver OSNR of the receiver connected to the optical link.

Another aspect of the present disclosure is directed towards a system for analyzing an optical network comprising at least one processor, configured to generate a linear optical signal-to-noise ratio (OSNR) and an output power profile for each optical link element of an optical link based on an input power profile, amplifier characteristics, transport fiber characteristics, and a set of operating parameters associated with each optical link element. The output power profile represents the input power profile of a next optical link element of the optical link. The processor is configured to generate a nonlinear OSNR for each optical link element based on the input power profile and transport fiber characteristics of each optical link element. The processor is configured to determine an expected performance metric for the optical link based on the linear OSNR, the non-linear OSNR, and a transmitter output OSNR. The processor is configured to designate the optical link as valid for use in the optical transport network based on determining that the expected performance metric is greater than or equal to a performance metric threshold.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The following figures are included to illustrate certain aspects of the present disclosure, and should not be viewed as exclusive implementations. The subject matter disclosed is capable of considerable modifications, alterations, combinations and equivalents in form and function, without departing from the scope of this disclosure.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Optical transport networks are capable of providing extremely high bandwidth for the transmission of data. Today, optical transport networks are responsible for transmitting a significant portion of all human and machine generated information. For example, optical transport networks enable today's internet and communication networks. Optical transport networks may transmit information through a plurality of optical links, or "paths." In some cases, an optical link may experience a failure due to faults in the optical links. In the event of a link failure, traffic on the failed optical link can be rerouted to a different optical link, referred to as a reroute link. Thus, it would be beneficial to design the optical transport network to achieve efficient rerouting of traffic along the reroute link. To design an optical transport network for efficient rerouting, it is important to accurately predict optical link performance and spectral efficiency along potential reroute links. The systems and methods of the present disclosure therefore provide a means of analyzing the performance and spectral efficiency of an optical link in an optical transport network. These techniques can be used to simulate, design, and analyze the optical transport network.

In typical optical transport network implementations, an optical signal is introduced to an optical link through terminal equipment, such as a transmitter or line card, at the starting point of the link. The optical signal may contain a plurality of channels, each channel assigned to a particular optical wavelength. The optical link can have one or more fiber amplifiers, which are optical fibers doped with gain material, for boosting the optical signal as it propagates through the optical link. The fiber amplifiers compensate for power loss as the optical signal propagates through the fiber. For purposes of this disclosure, power is defined as a function of energy, which is a function of wavelength, by the following relationship: Power=(energy/time)=hω/time=h(c/λ)/(time), where h is the Planck constant, w is the angular frequency of the signal, λ is the wavelength of the signal, and c is the speed of light. Also, angular frequency is related to the frequency by the following relationship: ω=2πf, where f is the frequency of the signal. Some modern high-bandwidth optical transport systems can use Raman amplifiers and/or erbium-doped fiber amplifiers (EDFA). In an EDFA, an optical fiber is doped with a gain material, and a pump laser is injected into the optical fiber. In a Raman amplifier, the gain is achieved in the transport fiber, which is typically not doped. Terminal equipment, such as a receiver, is usually present at the end of the optical link. The terminal equipment converts the optical signal to/from an electronic signal.

Optical link performance can be expressed as a bit-error-rate (BER) of the received signal, following demodulation and conversion of the optical signal. Bit error can be caused by distortion and/or power loss of the optical signal as it propagates through the optical link. The distortion may be caused by a multitude of factors, such as signal noise, nonlinear effects, and optical dispersion. The terminal equipment can correct some of these errors using forward error correction (FEC). The performance of the terminal equipment's FEC capability is expressed as a threshold BER that the terminal equipment can correct without leaving a substantial amount of post-FEC errors. Expressing optical link performance in terms of BER may be of limited use in the analysis of the optical transport network due to the dependency of BER on the terminal equipment. In some cases, fiber nonlinearities, which are induced by the sensitivity of the refractive index of the fiber's glass to the instantaneous power of the optical signal traversing the glass, can be particularly complex to compute when viewed as penalties in the BER domain. In other cases, the BER of a particular optical link may vary widely depending on the specific transmitter and/or receiver used. For example, terminal equipment employing coherent detection may be able to compensate for the chromatic and polarization mode dispersion of the optical signal caused by the optical link's fiber, and thus optical networks using coherent line cards typically do not require dispersion compensation modules along the fiber. Consequently, some sources of noise in the link, such as high symbol (Baud) rates (bits/sec), spectral shaping at the terminal equipment's transmitter, and the equalization process at the terminal equipment's receiver, can be considered negligible.

Measuring terminal equipment performance in terms of optical signal-to-noise ratio (OSNR) rather than BER may allow for easier computations when accounting for fiber nonlinearities. OSNR can be defined as the signal-to-noise ratio over a given reference bandwidth, typically 0.1 nm. The reference bandwidth is independent of noise from the modulation format, frequency, and the receiver type of the terminal equipment. Accordingly, OSNR does not depend on variations in modulation format, frequency, and receiver types between terminal equipment.

Predicting the performance of terminal equipment can thus be accomplished by predicting the optical signal's OSNR as it arrives at the receiver. If the receiver employs coherent detection, the noise contributed by the high symbol (Baud) rates, spectral shaping, and equalization may be represented as additive white Gaussian noise sources. This can simplify the prediction of terminal equipment performance by reducing the complexity of factoring in fiber nonlinearities. Thus, using OSNR values to predict the optical link's performance may reduce effect of variations between terminal equipment on the result.

The OSNR of the entire optical link can be described as the Effective OSNR which is defined as:

$$\frac{1}{OSNR_{EFF}} = \frac{1}{OSNR_{TX}} + \frac{1}{OSNR_{LIN}} + \frac{1}{OSNR_{NL}} + \frac{1}{OSNR_{RX}} + \sum_{impairments} \frac{1}{OSNR_{imp}}.$$

where $OSNR_{TX}$ is the OSNR when entering the optical link's fibers contributed by the terminal equipment's transmitter and node multiplexing structure, $OSNR_{LIN}$ is the contribution of the optical link's amplifiers, $OSNR_{NL}$ is the contribution of the fiber's nonlinearity, $OSNR_{RX}$ is the contribution of the terminal equipment's receiver and node demultiplexing structure, and $OSNR_{IMP}$ is the contribution of a series of transmission impairments; for example, chromatic dispersion, crosstalk, receiver power, polarization mode dispersion, and polarization dependent loss. As discussed above, when determining the OSNR for link performance purposes, only the $OSNR_{LIN}$ and $OSNR_{NL}$ are computed because they are functions of the optical link only, while the remaining OSNR terms are a function of the terminal equipment.

An optical link may comprise a series of optical link elements, where each optical link element can include an amplifier followed by an optical transport fiber. Determining the effective OSNR of the optical link may be achieved by computing the $OSNR_{LIN}$ and the $OSNR_{NL}$ for each optical link element. However, due to the complex nature of calculating the $OSNR_{NL}$, configuring a system to utilize traditional approaches for computing $OSNR_{NL}$ may require large computational times, and may also require implementing additional hardware within the system for predicting optical link performance. For example, computing the $OSNR_{NL}$ for each optical link element by using a split-step Fourier method generally requires an additional graphics processing unit (GPU) for acceleration. One aspect of this disclosure provides a system and method that can reduce the computational resources required to compute the $OSNR_{NL}$ for each optical link element. The systems and methods can therefore calculate the $OSNR_{NL}$ faster and without the need for additional or specialized hardware to accelerate the process.

Figure 1:
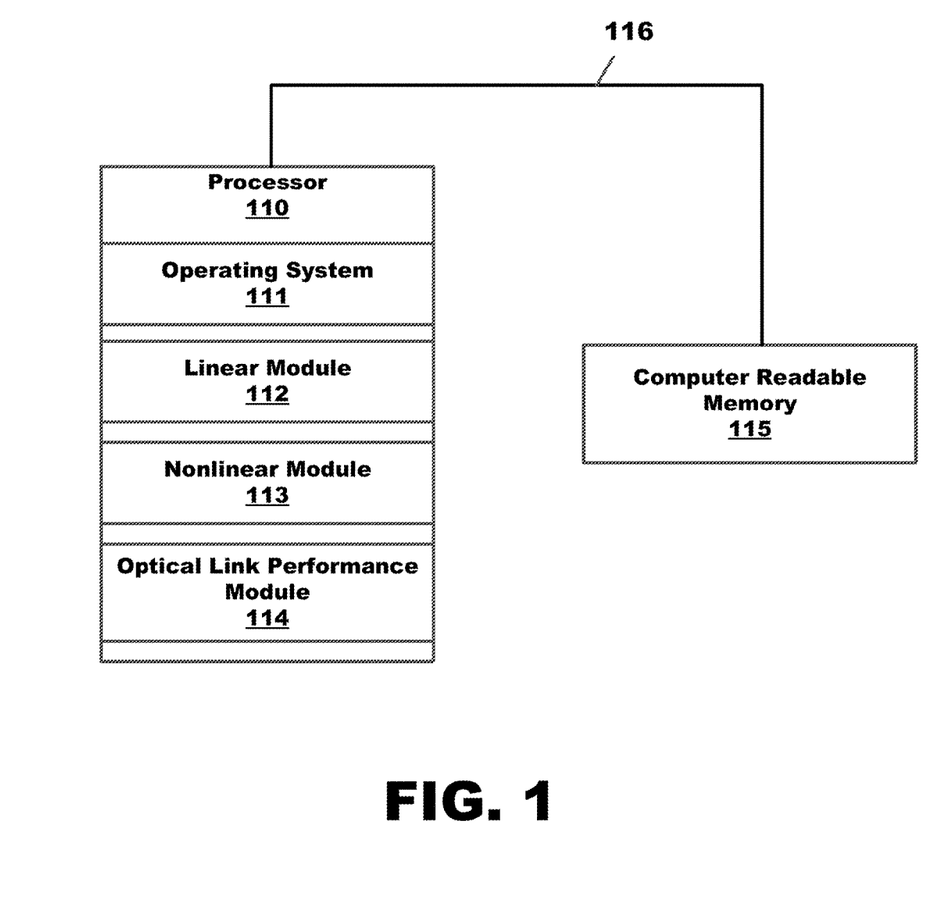
FIG. 1 illustrates a system for analyzing an optical transport network, according to an illustrative implementation.

FIG. 1 illustrates a system 100 for analyzing an optical transport network, according to an illustrative implementation of the present disclosure. The system 100 includes a processor 110 and a computer readable memory 115 connected by system bus 116. In some implementations, the processor 110 is a central processing unit (CPU). In some implementations, the processor 110 is a general purpose processor (GPP). In some implementations, the processor 110 is a programmable processor such as a field-programmable gate array (FPGA) or an application-specific integrated circuit (ASIC). The processor 110 executes a linear module 112, a nonlinear module 113, and an optical link performance module 114. The modules represent processing logic, and each component may be implemented as hardware, such as circuitry and dedicated logic, or software executed on the processor 110. The processor 110 is configured to receive optical link data associated with a given optical link, and store the optical link data in the computer readable memory 115. In some implementations, the processor 110 receives optical link data of a plurality of optical links. In some implementations, the optical link data includes the number of optical link elements within a given optical link. Each optical link element can include an amplifier coupled to an optical fiber. The amplifiers can include one or more Raman amplifiers and erbium-doped fiber amplifiers (EDFAs). In some implementations, the optical link data includes the length of the optical fiber of each optical link element. The processor 110 is further configured to receive terminal equipment data associated with terminal equipment—for example, a transmitter, receiver, and/or transceiver—at the endpoints of a given optical link. The terminal equipment data can include the OSNR caused by the transmitter, the OSNR caused by the receiver, the required OSNR of the terminal equipment, and the link margin. The required OSNR refers to the maximum amount of noise, as expressed by OSNR, that the terminal equipment can compensate for without substantial error following forward error correction. The optical link margin refers to the excess linear OSNR, meaning a larger linear OSNR than initially needed, and used to account for an increase in lossiness of optical link elements over their lifespan. The terminal equipment data is stored in the computer readable memory 115.

The processor 110 is configured to receive amplifier characteristics associated with one or more types of amplifiers. The amplifier characteristics may include, for example and without limitations: the amount of fiber-induced self-Raman scattering for a given Raman amplifier; the wavelength-dependent, power-dependent, gain-dependent gain shape for a given Raman amplifier; the wavelength-dependent, power-dependent, gain-dependent noise figure of a given Raman amplifier; the wavelength-dependent, power-dependent, gain-dependent gain shape of a EDFA; and/or the wavelength-dependent, power-dependent, gain-dependent noise figure of a given EDFA. In this disclosure, the term "noise figure" refers to the degradation of the SNR caused by the components of a given amplifier as compared to an ideal amplifier.

The processor 110 is configured to receive transport fiber characteristics. The transport fiber characteristics include information about the performance and physical properties of a transport fiber of an optical link element. The transport fiber characteristics can include, for example and without limitation, attenuation as a function of frequency, Raman gain coefficient as a function of difference in frequency, chromatic dispersion, chromatic dispersion slope, and a nonlinear coefficient.

In some implementations, the processor 110 is configured to receive operating parameters for each optical link element within the given optical link and store them in the computer readable memory 115. In some implementations, the processor 110 is configured to cause the linear module 112 to determine the operating parameters for each optical link element within the given optical link based on a set of design rules. In some implementations, the operating parameters include a desired amplifier type and a desired launch power. The amplifier type may include Raman amplifiers and EDFAs. Some amplifiers employed within optical transport networks may use pump lasers to amplify the optical signal propagating through the amplifier. Launch power therefore refers to the amount of signal power launched into an optical link element—i.e., the transport fiber—by the amplifier. EDFA parameters such as gain and variable optical attenuator settings can be obtained from the desired launch power. In some implementations, the design rules include a fiber type, an optical link element length, and a unit loss. The fiber type refers to the type of optical fiber used in the optical link element. For example, the optical fiber type may include several types of optical fibers used in optical transport networks such as single-mode optical fibers (SMFs), dispersion-shifted fiber (DSF), non-zero dispersion-shifted fibers (NZDSF), and ultra-large area fibers (ULAF). The optical link element length refers to the length of the fiber used in the optical link element; hereinafter referred to as "span length." In some implementations, the length is measured in kilometers (km). The unit loss refers to the amount of power a signal loses as it propagates through a given length of the optical link element; for example, 1 km. In some implementations, the unit loss is measured in decibels per km (dB/km). In some implementations, the linear module 112 is configured to derive the design rules based on a plurality of inputs. Design rule derivation is discussed below with reference to FIGS. 2 and 3. The processor 110 is also configured to store the determined operating parameters and the derived design rules in the computer readable memory 115.

The linear module 112 is configured to receive the operating parameters, input power profile, transport fiber characteristics, and amplifier characteristics from the computer readable memory 115. Based on the operating parameters, input power profile, transport fiber characteristics, and amplifier characteristics, the linear module 112 is configured to compute a linear OSNR and an output power profile for an optical signal as it exits each optical link element in the given optical link. Computation of the linear OSNR is discussed further with reference to FIGS. 2 and 3. The linear OSNR represents the contribution of the optical link element's amplifier to the overall effective OSNR of the entire optical link. The output power profile, or power spectral density, refers to the power, as a function of wavelength, of the optical signal as it exits the optical link element. The output power profile for an optical link element therefore represent the input power profile for the next successive optical link element. The output profile and the linear OSNR for each optical link element of a given optical link are stored in the computer readable memory 115.

For each optical link element, the linear module 112 either receives or computes operating parameters depending on the information available for the optical link elements. The operating parameters may include an amplifier type and a per-channel launch power for each optical link element. Computation of operating parameters is described below with reference to FIG. 3. Once the linear module 112 receives/computes the per-channel launch power for each optical link element, it can compute the power transfer between different frequencies (i.e., channels) of the optical signal that results from self-Raman scattering as the signal propagates through the fiber of the optical link element, as well as the power loss caused by propagation through the fiber. The power transfer and power loss is described by the following system of coupled nonlinear differential equations: $\delta_z P_K(z) = -\alpha_K P_K(z) - \Sigma_{m<k} g_{K,m} P_m(z) P_K(z) + \Sigma_{n>k} g_{n,k} (f_k/f_n) P_n(Z) P_k(z)$, where z represents the forward propagation direction in length (expressed in units of km), $P_k$ represents the power of the channel centered at frequency $f_k$ (expressed in units of W), $\alpha_k$ represents the unit propagation loss at frequency $f_k$ (expressed in units of 1/km), and $g_{m,n}$ represents the gain coefficient (expressed in units of 1/W/km) from frequency $f_m$ to frequency $f_n$, where the gain coefficient can correspond to the Raman gain of the fiber of the optical link element caused by the self-Raman scattering that occurs when an optical signal propagates through a fiber. The gain coefficients are known and based on the specific fiber type used within the optical link element. In some implementations, the optical transport network uses polarization-multiplexed optics for long-haul and metro optical networks. In that case, the gain coefficient used is preferably the average of the co-polarized and orthogonally-polarized gain coefficients. If the only data available is the co-polarized gain coefficient, since the orthogonally-polarized gain coefficient is typically much smaller in practice, half of the co-polarized gain coefficient may be used.

After accounting for power transfer and power loss, the linear module 112 can compute the linear OSNR contributed by the amplifier in each optical link element by using the following relationship NF=58-OSNR, where both OSNR and NF are expressed in dB. First, the linear module 112 determines the noise figure and gain coefficient for the amplifier in each optical link. This depends on the type of amplifier designated for use in the optical link element under consideration.

If an optical link element contains a Raman amplifier, the linear module 112 can compute the linear OSNR attributed to the Raman amplification. The Raman gain coefficient due to the Raman amplification in the Raman amplifier can be expressed as $G_R(\lambda, L_S, L_P)$ for the optical link element's fiber type. The Raman amplifiers effect is captured by a series of steps. First, if $G_0$ is known, which is associated with the amplifiers Raman gain coefficient corresponding to a maximum input frequency (e.g., the resonant frequency of the Raman amplifier), the linear module 112 can compute the pump point loss $L_{P,EFF}$ associated with the maximum input frequency such that $G_0 = <G_R(\lambda, L_S, L_{P,EFF})>$. Solving for the pump point loss value is accomplished by extrapolating the function $H(L_P) = G_R(\lambda, L_S, L_P)$ to the value $G_0$, using spline interpolation or other forms of interpolation, such as polynomial interpolation. If the Raman gain $G_0$ is not known, the linear module 112 uses a pump point loss of 0.5 dB.

The linear module 112 can determine the unit loss by deriving the design rules, or in the case of Brownfield mode operations, the system 112 can determine the unit loss when the operating parameters (and thereby the design rules) are received. With the unit loss and pump point loss known, the linear module 112 can determine the allowed Raman gain (based on maximum power allowed after the Raman amplifier, and the fiber type, unit loss, and pump loss). The Raman gain and noise figures are provided for a set of data points $\{\lambda_{REF}, L_{S,REF}, L_{P,REF}\}$ where $\lambda_{REF}$ is the set of reference wavelengths; $L_{S,REF}$ is the set of reference fiber unit loss values; and $L_{P,REF}$ is the set of reference point loss values. The linear module 112 can perform a Delaunay triangulation based interpolation to find the nearest three reference points to the desired ($L_S$ and $L_P$) values of fiber unit loss and pump point loss respectively, and interpolate those linearly to extract the Raman gain and noise figure waveforms as a function of $\lambda_{REF}$ for the desired $L_S$ and $L_P$ values. The linear module 112 can interpolate the waveform to the desired input wavelengths using a cubic spline interpolator, or other forms of interpolation, to find the Raman gain and noise figures for the desired input wavelengths (e.g. launch powers).

For optical link elements including an EDFA, the linear module 112 can perform a computation similar to that done for a Raman amplifier. The linear module 112 can determine the target EDFA gain, based on targeting the maximum possible output power post-EDFA gain block, and then padding down to the next optical link element's target launch power, using the variable optical attenuator (VOA, which are normally present in EDFAs) at the EDFA's output. This configuration reduces the EDFA's noise figure, and improves link performance by up to one dB. The EDFA gain and noise figure are provided for a set of data points $\{\lambda_{REF}, G_{REF}, P_{OUT,REF}, \text{tilt}\}$, where $\lambda_{REF}$ is the set of reference wavelengths, $G_{REF}$ is the set of reference EDFA gain values; $P_{OUT,REF}$ is the set of reference EDFA output power values; and tilt is the set gain tilt across the amplification band. The linear module 112 can perform a Delaunay triangulation based interpolation to find the nearest three reference points to the desired ($G_{REF}, P_{OUT,REF}$, tilt) values, and then interpolate those linearly to extract the EDFA gain and noise figure waveforms as a function of the reference wavelength for the desired values. This waveform is then interpolated using a cubic spline interpolator or other forms of interpolators to the desired wavelength values. An example method of calculating a linear OSNR is described below with reference to FIG. 3.

Once the noise figures for each amplifier is determined, the linear module 112 can compute the linear OSNR attributed to each optical link element using the earlier described relationship between noise figure and OSNR. The linear module 112 can store the linear OSNR contribution for each optical link element in the computer readable memory 115.

The nonlinear module 113 is configured to receive, from the computer readable memory 115, the output power profile and the linear OSNR for each optical link element of a given optical link, where the output power profile of an optical link element represents the input power profile of the next successive optical link element in the optical link. The nonlinear module 113 is configured to compute, based on the linear OSNR, the input power profile, and transport fiber characteristics associated with each optical link element in a given optical link, an output nonlinear OSNR for each of the optical link elements. In some implementations, the output nonlinear OSNR is computed using a Volterra-Series propagator. In some implementations, the nonlinear module 113 can compute two Volterra series runs. In some implementations, the output nonlinear OSNR is computed using a split-step Fourier propagator. In some implementations the nonlinear module 113 can be configured to treat nonlinear effects as a perturbative element in the overall electric field of the signal. Details involving the computation of the nonlinear OSNR using the Volterra-Series propagator and/or the split-step Fourier propagator are discussed further below with reference to FIG. 2. The computed nonlinear OSNR at the output of each optical link element for a given optical link is stored in the computer readable memory 115.

In some implementations, the nonlinear module 113 can be configured to treat nonlinear effects as a perturbative element in the overall signal electric field. Thus, the total (vector) field post-transmission can be defined as $E_{TOTAL}=E_{LIN} E_{NL}=E_{UN}+\Sigma_K E_{NL,K}$, where the summations are performed over optical link elements, and decomposes the nonlinear field as a sum of per optical link element components. The nonlinear power spectral density generated by the fiber is then expressed $P_{NL}=|E_{NL}|^2=|\Sigma_k E_{NL,K}|^2=\Sigma_{m,n} E^*_{NL,m}E_{NL,n}=\Sigma_k|E_{NL,k}|^2+\Sigma_{m\neq n}\text{Re}(E^*_{NL,m}E_{NL,n})$, where all terms in the double summation are expressed under the form $k\sqrt{P_{NL,m}}\sqrt{P_{NL,n}}$ where k is the correlation coefficient (which can be valued between $-1$ and $+1$) between a pair of successive optical link elements and k is purely a function of the difference in chromatic dispersion (CD) state between a pair of successive optical link elements (i.e. $k(CD_m-CD_n)$ where $CD_m$ is the chromatic dispersion at the beginning of optical link element (m) and $CD_n$ is the chromatic dispersion at the beginning of optical link element (n)). The correlations coefficient function k has the following properties: (1) at CD=0, k has a value of one (i.e., for resonant successive optical link elements); and (2) k decays to 0 at very high dispersion (i.e., for decorrelated successive optical link elements). Thus, the nonlinear power spectral density for the optical link takes the form $P_{NL}=|E_{NL}|^2=|\Sigma_k E_{NL,k}|^2=\Sigma_{m,n}E^*_{NL,m}E_{NL,n}=\Sigma_{m,n}k(CD_m-CD_n)\sqrt{P_{NL,m}}\sqrt{P_{NL,n}}$ Propagation of a signal through a fiber can be described using the nonlinear Schrodinger equations (NLSE). The nonlinear module 113 using the Volterra series propagator can decompose the NLSE using the Volterra series transform function. This yields the nonlinear electrical field as being equal to:

$$E_{NL}(\omega)=\iiint H_3(\omega,\omega_1,\omega_2)E(\omega_1)E^*(\omega_2)E(\omega-\omega_1+\omega_2)d\omega_1 d\omega_2 dz.$$

$H_3$ represents the third-order Volterra kernel used in the field Volterra series expansion. The expression provides an approximation of the electrical waveform with relatively high accuracy. The integrated third order Volterra kernel takes the form:

$$\int H_3(\omega,\omega_1,\omega_2)dz=-(\gamma/\alpha)[1-\exp\{(-\alpha/2+i\beta_2\Delta'\Omega)/L\}]/\sqrt{[1+\Delta'\Omega\beta_2/\alpha)^2]}=\eta(\Delta'\Omega)$$

Where: $\Delta'\Omega=(\omega-\omega_1)(\omega-\omega_2)$.

$\gamma$ is the fiber's nonlinear coefficient, $\alpha$ is the fiber's loss coefficient, $\beta_2$ is the second order group velocity dispersion, and L is the fiber's length in a given optical element. $\beta_2$ is a parameter that is constant, but may be different, for each center frequency of interest.

In some implementations, the nonlinear module 113 can be configured to compute the nonlinear power spectral density at a given frequency $\omega$ under the assumption that any given pair of successive optical link elements has uncorrelated frequency components. This assumption may be valid because optical signals can experience sufficient dispersion as it propagates through the fiber in many optical transport networks. The nonlinear power spectral density of a given fiber in that case is represented as $S_{NL}(\omega)=\iint |\eta(\Delta'\Omega)|^2 S(\omega_1) S(\omega_2)S(\omega-\omega_1+\omega_2) d\omega_1 d\omega_2$ where the integral can be discretized with sufficient resolution (of the order of 1 GHz), and these integrals, as the sum of the elements of large 2-dimensional arrays, are computed.

The nonlinear module 113 can use efficient numerical integration quadratures, which have the property of controlling the integration error to an arbitrary order. That is, to implement the computation of the nonlinear power spectral density to evaluate the integral, three components are considered. These components include $S(\omega_1)S(\omega_2)$, $S(\omega-\omega_1+\omega_2)$, and $|\eta(\Delta'\Omega)|^2$. These expressions are treated as 2-dimensional arrays, which allow the computation of the power spectral density to be performed as a combination of sub-array extractions, element-by-element multiplications and array sum.

These terms can be handled sequentially. First the matrix defined by $S(\omega_1)S(\omega_2)$ (hereinafter matrix A) is obtained by forming the tensor product of the 1-dimensional array $S(\omega_1)$ by itself (i.e. $VV^T$, if V is the N×1 array $[S(\omega_1)]$). This term remains invariant for all values of $\omega$. If the frequency grid chosen requires N samples to cover $[-B_{OPT}/2+B_{OPT}/2]$ the matrix size N×N may be preferred. The matrix $S(\omega-\omega_1+\omega_2)$ (hereinafter matrix B) can be obtained by tiling the values in the array $S(\omega_1)$ into a matrix. The matrix is symmetric around its first diagonal, and it may be chosen to span $B_{OPT}\times B_{OPT}$ (i.e. its size is N×N). The matrix $M_0$ corresponds to the matrix B with $\omega=0$. The desired matrix M can be obtained after translating the coefficients in $M_0$ by the number of samples corresponding to the actual values of $\omega$ (which is done through a circular permutation of $M_0$, which is a matrix multiplication with a permutation matrix), and then zeroing out the coefficients outside the expected integral support. The matrix $\Delta'\Omega=(\omega-\omega_1)(\omega-\omega_2)=\omega^2-\omega(\omega_1+\omega_2)+\omega_1\omega_2$ can be generated as the matrix sum of three terms: $\omega^2$ is a constant (for each channel chosen), $\omega(\omega_1+\omega_2)$ is the product of a scalar by the fixed matrix $\omega_1+\omega_2$, and $\omega_1\omega_2$ is the tensor product of the frequency array obtained as in matrix A. The matrix $|\eta(\Delta'\Omega)|^2$ (hereinafter matrix C) can be obtained through element-by-element matrix operations.

Typical matrix sizes can be estimated as follows: the typical C+L transmission spectrum is estimated to be 9.6 THz, i.e. approximately 10 THz when accounting for the guard band between C and L bands. Assuming a resolution of 1 GHz, this matrix is of size $10^4 \times 10^4$., i.e. approximately 100 million coefficients.

It may be preferred for the integration area (which is to be understood as the support, in a topological sense, of the function being integrated) in the space $(\omega_1, \omega_2)$ to meet the following conditions, if the spectrum (in baseband) is characterized as being [-Bopt/2, +Bopt/2]: (1) -Bopt/$2 \leq \omega_1 \leq$ Bopt/2; (2) -Bopt/$2 \leq \omega_2 \leq$ Bopt/2; and (3) -Bopt/$2 \leq \omega - \omega_1 + \omega_2 \leq$ Bopt/2. This method allows for the computation of the nonlinear SNR contribution of an individual optical link element. However, while using the Volterra propagator may not be perfectly suited for a determination of the absolute amount of nonlinear noise, it can be well-suited for computing a relative change.

Therefore, in some implementations, the nonlinear module 113 can compute two Volterra series runs. In Run 1, the $S_{NL,0}(\omega)$ is computed by using a flat power profile (i.e. the output power profile for each optical link element computed by the linear module 112) set to the average launch power into the span $P_0$. In Run 2, $S_{NL,1}(\omega)$ is computed using the actual output power profile computed by the linear module 112. Then the quantity $\delta P(\omega) = [S_{NL,1}(\omega)/S_{NL,0}(\omega)]^{1/3}$ is computed. This quantity indicates how much it appears by which the environment (in terms of per-channel average power) of a given channel is offset. For example, if $\Sigma_P = 2$ dB, it may mean that the channel is experiencing a nonlinear penalty (due to the wavelength depending launch profile) substantially equal to a flat launch power profile, but 2 dB higher in launch power.

The nonlinear SNR of each optical link element may then be calculated by using a calibration run (for an optical link element with flat launch power $P_{REF}$ and effective length $L_{EFF,REF}$) generated through a split-step method, with SNR values equal to $SNR_{NLREF}(\omega)$. In some implementations the calibration run is performed by using a split-step Fourier propagator. When the split-step Fourier propagator is used, the nonlinear SNR is defined as $SNR_{NL}(W) = P_0 \delta P(\omega) / P_{REF}]^{-2} [L_{EFF}/L_{EFF,REF}]^{-2} SNR_{NL,REF}(\omega)$. The calibration run may therefore be performed using a single reference run per fiber type. The calibration run may be set at high accuracy, which means that the maximum nonlinear phase accumulation over a single step of the split-step is set to $10^{-5}$ radians, or even less.

As a result of these relationships, the nonlinear OSNR for the optical link may be computed by the following steps. First, the nonlinear OSNR waveform for each optical link element is computed. In some implementations, the nonlinear OSNR waveform for each optical link element can be computed in parallel. This is due to the fact that the equation for the nonlinear power spectrum allows for decoupling between optical link elements. Each optical link element's contribution can be derived separately, and then reassembled to get the entire optical link's contribution through the correlation coefficients. The correlation data can be generated through a series of 2-span interference simulations. In the simulations, the signal transmitted can be set to a high dispersion value (of the order of 10 ns/nm). This may ensure that the nonlinear OSNR generated by both optical link elements is near-identical. The chromatic dispersion between both optical link elements is swept, and the nonlinear OSNR of the simulation setup is compared to that of a single optical link element. Also, for each optical link element, the nonlinear OSNR value for a given optical link element and a given channel can be computed using $S_{NL}(\omega) = \iint |\eta(\Delta'\Omega)|^2 S(\omega_1) S(\omega_2) S(\omega - \omega_1 + \omega_2) d\omega_1 d\omega_2$, as a discretized integral, where the contributing terms are expressed as 2-dimensional arrays. These values are aggregated to compute the per-wavelength nonlinear OSNR value for the entire link by computing $\Sigma_{m,n} k(CD_m - CD_n) \sqrt{P_{NL,m}} \sqrt{P_{NL,n}}$.

Using the Volterra series propagator may allow the realization of several benefits. For one, the nonlinear module 113 can be implemented on commodity CPU hardware, as the computations can be streamlined enough such that specialized computation hardware may not be necessary. Also, further reductions in computation and complexity can be achieved when only data associated with a subset of channels (i.e. one out of every six) is received. Thus the design system can achieve a reduction in cost while decreasing computation time.

The optical link performance module 114 is configured to retrieve, from the computer readable memory 115, the terminal equipment data, the nonlinear OSNR computed for each optical link element, the linear OSNR generated for each optical link element, and the output power profile generated for each optical link element. Based on the nonlinear OSNR for each optical link element, the linear OSNR for each optical link element, and an output OSNR of a transmitter connected to the optical link, the optical link performance module 114 is configured to compute an expected performance metric at the output of a given optical link. The expected performance metric can be calculated based on the linear OSNR, the non-linear OSNR, and the transmitter output OSNR. In some implementations, the expected performance metric can be calculated as a sum of the respective noise contributions of each aspect of the optical link as expressed by an OSNR value. Generally, the noise contribution can be represented as an inverse of an OSNR value. Thus, for example, the expected performance metric can be calculated as a sum of inverses of the linear OSNR, the non-linear OSNR, a transmitter OSNR of a transmitter connected to the optical link, and a receiver OSNR of the receiver connected to the optical link. If the expected performance metric is greater than or equal to a performance metric threshold, the optical link performance module 114 designated the optical link as valid for use within the optical transport network. In some implementations, the expected performance matrix is an effective OSNR and the performance metric threshold is a required OSNR. A valid link represents an optical link that is expected to deliver an optical signal to the terminal equipment that will meet the terminal equipment's BER threshold (i.e. the amount of BER that the terminal equipment can FEC without significant post-FEC error). If the expected performance metric is less than the performance metric threshold, the optical link performance module 114 determines that the optical link is invalid for use within the optical transport network. An invalid link represents an optical link that is expected to deliver an optical signal to the terminal equipment that does not meet the terminal equipment's BER threshold, and therefore significant post-FEC error may occur in the optical transport network.

Figure 2:
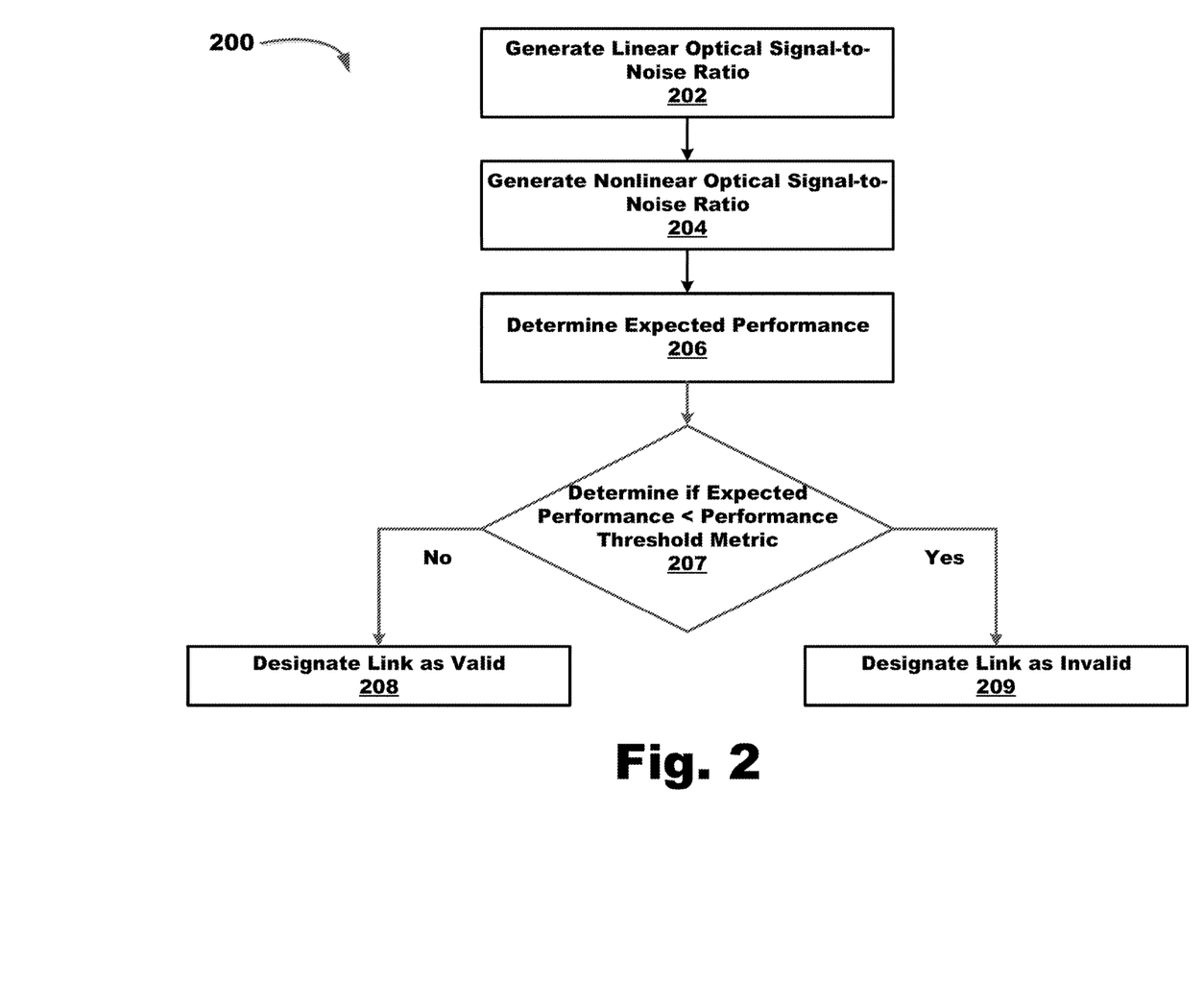
FIG. 2 is a flow chart of a method of analyzing an optical transport network according to an illustrative implementation.

FIG. 2 is a flow chart of a method 200 of analyzing an optical transport network according to an illustrative implementation of the present disclosure. The method 200 includes generating a linear OSNR (stage 202), generating a nonlinear OSNR (stage 204), determining an expected performance (stage 206), and determining if the expected performance is less than a performance threshold (decision block 207). If it is determined that the expected performance is not less than a performance threshold, the method 200 further includes designating the link as valid (stage 208). If it is determined that the expected performance is less than the performance threshold, the method 200 further includes designating the link as invalid (stage 209). The method 200 can be performed, for example, by the system 100 for analyzing an optical transport network.

The method 200 includes generating a linear OSNR (stage 202). The processor 110 causes the linear module 112 to generate a linear OSNR for each optical element in a given optical link. The linear module 112 uses an input power profile, amplifier characteristics, transport fiber characteristics, and a set of operating parameters to compute a linear OSNR contribution for each optical link element. In some implementations, the processor 110 of the system 100 is configured to receive the amplifier characteristics. The output power profile represents the input power profile of a next optical link element of the optical link. The amplifier characteristics may include reference Raman gain values for several input signal wavelengths, where the Raman gain is a function of fiber type, span unit loss, and pump point loss. Thus several reference Raman gain values are received for several wavelengths according to the fiber type used in the optical link element. In some implementations these values have been predetermined based on experimental testing. In some implementations, the amplifier characteristics includes reference EDFA gain values for several input signal wavelengths, where the EDFA gain is a function of wavelength and an EDFA power output value. Thus, several reference Raman or EDFA gain values may be received for several wavelengths according to the fiber type used in the optical link element. The operating parameters can include a desired launch power and a desired amplifier type (Raman and/or EDFA). An example method of calculating a linear OSNR is described below with reference to FIG. 3.

In some implementations, the method 200 further includes generating an output power profile. This includes generating an output power profile for each optical link element in a given optical link based on optical link element loss, Raman scattering in the transport fiber, and amplifier gain. For each optical link element, the linear module 112 can use the optical link element loss and amplifier gain to determine the output power for each channel as the signal exits each amplifier (i.e. the output power profile) by utilizing the power transfer and power loss relationship described earlier. The linear module 112 can store each output power profile in the computer readable memory 115.

The method 200 includes generating a nonlinear OSNR (stage 204). This includes generating a nonlinear OSNR contribution for each optical link element based on the optical link element's input power profile and transport fiber characteristics. The nonlinear OSNR represents the OSNR contributed by the optical signal power-induced refractive index changes in the fiber. The nonlinear OSNR can be generated, for example, by the nonlinear module 113 of the system 100. The nonlinear module 113 can retrieve the input power profile and transport fiber characteristics of each optical link element from the computer readable memory 115, and uses it to generate the nonlinear OSNR for the entire optical link. In some implementations, the nonlinear module 113 can use a Volterra series propagator and/or a split-step Fourier propagator to compute the nonlinear OSNR for the entire link.

In some implementations, the method 200 further includes receiving terminal equipment data. The processor 110 is configured to receive data related to the terminal equipment used within a given link in an optical transport network. The terminal equipment data can include the terminal equipment's $OSNR_{IMP}$, $OSNR_{TX}$, ROSNR and its OSNR (margin), which is the OSNR due to the optical links margin. The optical link margin refers to the excess linear OSNR, meaning a larger linear OSNR than initially needed, and used to account for an increase in lossiness of optical link elements over their lifespan. These values are stored in the computer readable memory 115.

The method 200 further includes determining an expected performance metric (stage 206). The expected performance metric can be determined, for example, by the optical link performance module 114 of the system 100. The optical link performance module 114 is configured to compute the effective OSNR of a given link. The effective OSNR is computed by using the following expression $1/OSNR'_{EFF}(\lambda)=1/OSNR_{TX}+1/OSNR'_{LIN}(\lambda)+1/OSNR_{NL}(\lambda)+1/OSNR_{RX}+\Sigma_{impairments}1/OSNR_{IMP}$, where $OSNR'_{LIN}$ is the optical links linear OSNR accounting for link margin.

The method 200 further includes determining if the expected performance is less than a performance threshold metric (decision block 207). In some implementations, the performance threshold metric is the terminal equipment's ROSNR.

If the expected performance is not lesser than the performance threshold metric, the method 200 includes designating the link as valid (stage 208). For a given channel at the wavelength λ, link closure for a link's terminal equipment type and modulation format under test is achieved if and only $OSNR'_{EFF} \geq ROSNR$. Thus, if the effective OSNR of the optical link is greater than or equal to the ROSNR, the optical link performance module 114 designates the link as valid. A valid optical link represents an optical link that will deliver an optical signal to the terminal equipment with a BER that the terminal equipment can FEC without leaving significant post-FEC error.

If the expected performance is lesser than the performance threshold metric, the method 200 includes designating the link as invalid (stage 209). For example, if the effective OSNR is less than the ROSNR, the optical link performance module 114 may designate the link as invalid. An invalid optical link represents an optical link that will deliver a signal to the terminal equipment that may have significant post-FEC error. In some cases, an optical link may be invalid for use with one set of terminal equipment, but valid for another set of terminal equipment or modes.

Figure 3:
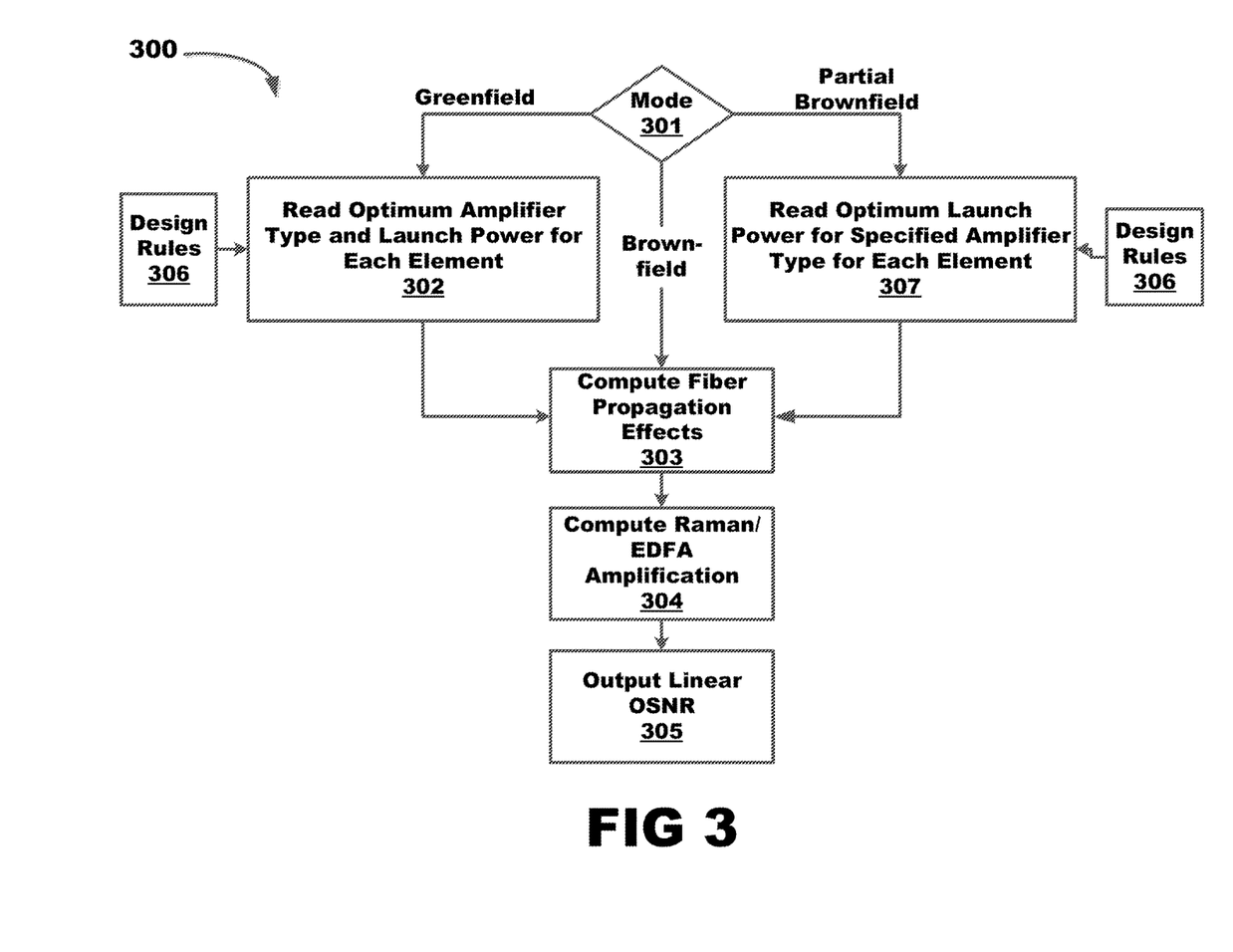
FIG. 3 is a flow chart of an example method of calculating a linear optical signal-to-noise ratio according to an illustrative implementation.

FIG. 3 is a flow chart of an example method 300 of calculating a linear optical signal-to-noise ratio according to an illustrative implementation of the present disclosure. In some implementations, the linear module 112 is configured to perform the method 300. The method 300 includes choosing a mode of operation (stage 301). In some implementations, a user may select the mode of operation. In some implementations, the system 100, for example, may determine the mode of operation based on the information available. As shown in FIG. 3, the system 100 can operate in one of three modes depending on the information available for the optical link elements. In Brownfield mode, the amplifier types and launch powers (i.e. operating parameters) are known and specified for every optical link element. Brownfield mode may be preferred when validation of a known optical link is desired. In Greenfield mode, the operating parameters for each optical link element in an optical link are not known and specified. Greenfield mode may be preferred when designing a new link is desired. During Greenfield mode operations, the method 300 includes reading the optimum amplifier type and launch power for each optical link element (stage 302). In Partial Brownfield mode, the amplifier types are known and specified for a subset of an optical link's optical link elements. The system 100 can optimize the launch power while honoring the amplifier selection on that subset of spans, then compute the expected performance per line card, modulation format, and channel. Partial Brownfield mode may be preferred when link re-optimization is desired (e.g., for an optical link previously designed, the optical link may see an improvement when redesigned). During Partial Brownfield mode operations, the method 300 includes reading the optimum launch power for the specified amplifier type for each optical link element (stage 307).

In some implementations, the system 100 operates in Brownfield mode, in which the amplifier types and launch powers are known for every optical link element, and are used to compute the nonlinear OSNR for each optical link element. Because these operating parameters are known, the fiber type, span length, and unit loss are known for each optical link element.

During Greenfield mode operations, the method 300 includes reading the optimum amplifier type and launch power for each optical link element (stage 302). In Greenfield mode, the operating parameters for each optical link element in an optical link are not specified, and the linear module 112 determines the operating parameters based on a set of design rules 306. The operating parameters in this case are the desired launch power and amplifier type required for each optical link element to yield a desired optical link capacity (e.g., the amount of transmitted data the optical link is able to support). In some implementations, the design rules 306 include fiber type, span length, and unit loss. The design rules 306 may be used to select a set of operating parameters for each optical link element. The operating parameters include a desired launch power and a desired amplifier type (e.g., Raman or EDFA). In some implementations, the linear module 112 can be configured to select operating parameters based on a set of design rules 306 (fiber type, span length, and unit loss) while operating in Greenfield mode. In some implementations, the linear module 112 can be configured to derive the design rules 306.

The design rules 306 may be based on the following inputs: (1) a set of reference span lengths for which to optimize (typically, 40 km to 120 km, in increments of 5 km); (2) a set of reference span unit losses for which to optimize (typically, 0.20 dB/km to 0.30 dB/km, in increments of 0.01 dB/km); (3) a predetermined fiber type; and/or (4) the nonlinear OSNR for each wavelength of a signal resulting from a standard nonlinear reference run of a single optical link element of the predetermined fiber type. The nonlinear OSNR can be based on an 80 km span (L,REF) with 16 dB loss, at P(ref)=0 dBm/ch, at full channel loading, with input channels' chromatic dispersion pre-distorted at 10 ns/nm, where the nonlinear OSNR computed in this reference run is defined as $OSNR_{NL,REF}$; a range of per-channel launch powers to explore (typically, −10 dBm to +3 dBm, in steps of 0.5 dB; and a set of amplifier types allowed for use with the optical link. Pre-distorting the input channels' chromatic dispersion by offsetting the chromatic dispersion by such a specified value may be important to set the channels' peak-to-average power ratio to its steady-state value, and thus not underestimating all the nonlinearity an optical link element could possibly generate.

The design rules may be derived by first selecting a reference span loss and a reference span length. Then the linear module 112 can compute the associated span effective length ($L_{EFF}$) based on the selected reference span loss and reference span length. For a given amplifier allowed, and for a given per-channel launch power $P_{CH}$ in the allowed range, the linear OSNR waveform $OSNR_{LIN(\lambda)}$ is computed. The nonlinear OSNR waveform is then equal to $OSNR_{NL}(\lambda) = (P_{CH}/P_{REF})^2 (L_{EFF}/L_{EFF,REF})^1 OSNR_{NL,REF}(\lambda)$, where all the quantities are expressed in linear units. The effective OSNR waveform for the optical link element is then $OSNR_{EFF}(\lambda) = \{(1/OSNR_{LIN}(\lambda)) + (1/OSNR_{NL}(\lambda))\}^{-1}$, where all the quantities are expressed in linear units. The operating parameters are then chosen by finding:

AmplifierOPT=argmaxAMPLIFIER{max $P$ min$\lambda$ $OSNR_{EFF}(\lambda,$Amplifier,$P)$}, POPT=argmax $p$ {min $\lambda$ $OSNR_{EFF}(\lambda,$AmplifierOPT, $P)$}.

AmplifierOPT represents and optimal amplifier type, POPT represents an optimal launch power, maxP and min$\lambda$ represent the maximum launch power and minimum wavelength needed to establish the largest minimum or average effective OSNR across all. This means that the linear module 112 can optimize for the desired amplifier type and launch power that achieves the largest minimum or average effective OSNR across all wavelengths. Thus, when presented with a given optical link element, the linear module 112 can search for the reference optical link element in the design rules with the matching fiber type, and with the nearest lower span length and unit loss, and can use the design rules from that reference optical link element to select the desired amplifier type and launch power. As discussed earlier, in Partial Brownfield mode, the linear module 112 is only selecting the desired launch power for a specified amplifier type for a subset of optical link elements. The linear module 112 can do this using a similar process but only optimizing for launch power (i.e. POPT). During Brownfield mode operations, the operating parameters are known, and thus the fiber type, span length, and unit loss are known for each optical link element.

When operating in Partial Brownfield mode, the method 300 includes reading the optimum launch power for the specified amplifier type for each element (stage 307). In Partial Brownfield mode, the amplifier types are known and specified for a subset of an optical link's optical link elements. In Partial Brownfield mode, the linear module 112 determines the desired launch power for each optical element of the subset of optical elements, while honoring the specified amplifier types of the subset of optical link elements.

Once the operating parameters are determined, the method 300 includes computing the fiber propagation effects (stage 303), computing the Raman/EDFA amplification (stage 304) and outputting the linear OSNR (stage 305). Performance of these stages is described above with reference to FIG. 2.

Figure 4:
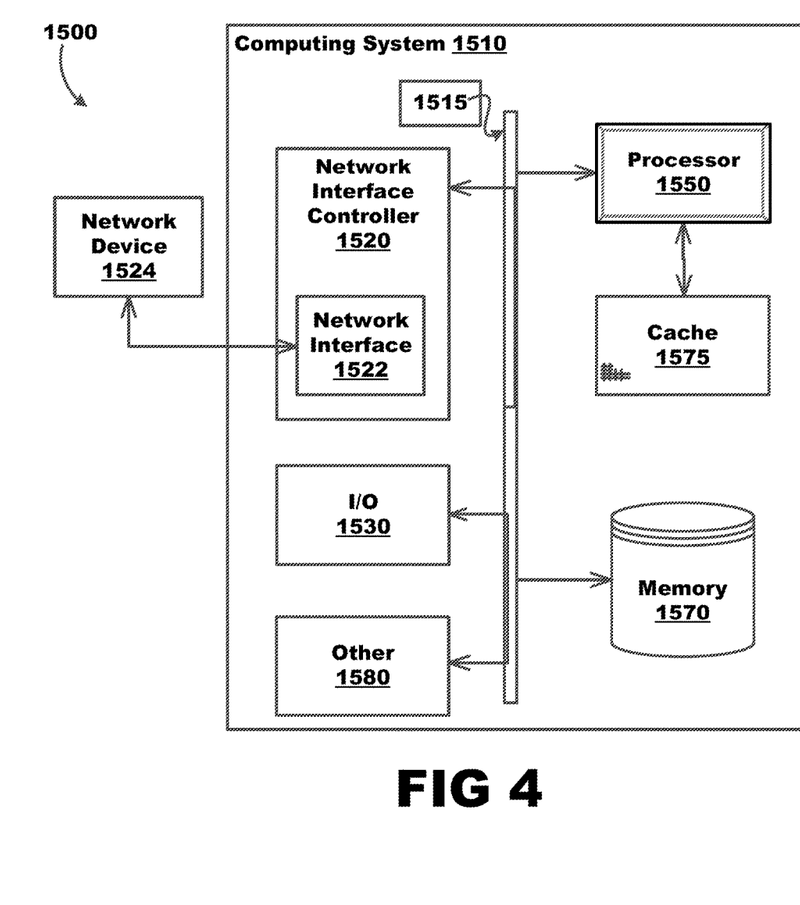
FIG. 4 is a block diagram illustrating a general architecture for a computer system that may be employed to implement elements of the systems and methods described and illustrated herein, according to an illustrative implementation.

FIG. 4 is a block diagram illustrating a general architecture for a computer system 1500 that may be employed to implement elements of the systems and methods described and illustrated herein, according to an illustrative implementation. The computing system 1500 can be used to implement one or more of the devices described above, including the system 100 for analyzing an optical transport network. The computing system 1500 may be utilized in implementing the method 200 for analyzing an optical transport network, as shown in FIG. 2.

In broad overview, the computing system 1510 includes at least one processor 1550 for performing actions in accordance with instructions, and one or more memory devices 1570 or 1575 for storing instructions and data. The illustrated example computing system 1510 includes one or more processors 1550 in communication, via a bus 1515, with at least one network interface controller 1520 with one or more network interface ports 1522 connecting to one or more network devices 1524, memory 1570, and any other devices 1580; e.g., an I/O interface. Generally, a processor 1550 will execute instructions received from memory. The processor 1550 illustrated incorporates, or is directly connected to, cache memory 1575.

In more detail, the processor 1550 may be any logic circuitry that processes instructions, e.g., instructions fetched from the memory 1570 or cache 1575. In many embodiments, the processor 1550 is a microprocessor unit or special purpose processor. The computing device 1500 may be based on any processor, or set of processors, capable of operating as described herein. In some implementations, the processor 1550 can be capable of executing method 200 for analyzing an optical transport network shown in FIG. 2. The processor 1550 may be a single core or multi-core processor. The processor 1550 may be multiple processors. In some implementations, the processor 1550 can be configured to run multi-threaded operations. In some implementations, the processor 1550 may host one or more virtual machines or containers, along with a hypervisor or container manager for managing the operation of the virtual machines or containers. In such implementations, method 200 for analyzing an optical transport network shown in FIG. 2 can be implemented within the virtualized or containerized environments provided on the processor 1550.

The memory 1570 may be any device suitable for storing computer readable data. The memory 1570 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 1500 may have any number of memory devices 1570. In some implementations, the memory 1570 can include instructions corresponding to method 200 for analyzing an optical transport network shown in FIG. 2. In some implementations, the memory 1570 supports virtualized or containerized memory accessible by virtual machine or container execution environments provided by the computing system 1510.

The cache memory 1575 is generally a form of computer memory placed in close proximity to the processor 1550 for fast read times. In some implementations, the cache memory 1575 is part of, or on the same chip as, the processor 1550. In some implementations, there are multiple levels of cache 1575, e.g., L2 and L3 cache layers.

The network interface controller 1520 manages data exchanges via the network interfaces 1522 (also referred to as network interface ports). The network interface controller 1520 handles the physical and data link layers of the OSI model for network communication. In some implementations, some of the network interface controller's tasks are handled by the processor 1550. In some implementations, the network interface controller 1520 is part of the processor 1550. In some implementations, a computing system 1510 has multiple network interface controllers 1520. The network interfaces 1522 are connection points for physical network links. In some implementations, the network interface controller 1520 supports wireless network connections and an interface port 1522 is a wireless receiver/transmitter. Generally, a computing device 1510 exchanges data with other network devices 1524 via physical or wireless links to a network interfaces 1522. In some implementations, the network interface controller 1520 implements a network protocol such as Ethernet.

The other network devices 1524 are connected to the computing device 1510 via a network interface port 1522. The other network devices 1524 may be peer computing devices, network devices, or any other computing device with network functionality. For example, a first network device 1524 may be a network device such as a hub, a bridge, a switch, or a router, connecting the computing device 1510 to a data network such as the Internet.

The other devices 1580 may include an I/O interface, external serial device ports, and any additional co-processors. For example, a computing system 1510 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 1500 includes an additional device 1580 such as a coprocessor, e.g., a math co-processor can assist the processor 1550 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an internetwork (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A method of analyzing an optical transport network comprising:
generating a linear optical signal-to-noise ratio (OSNR) and an output power profile for each optical link element of an optical link based on an input power profile, amplifier characteristics, transport fiber characteristics, and a set of operating parameters associated with each of the optical link elements, wherein the output power profile represents the input power profile of an adjacent downstream optical link element of the optical link, and the linear OSNR is generated by:
computing fiber propagation effects, and
computing amplifier gain and noise figures;
generating a nonlinear OSNR for each of the optical link elements based on the input power profile and transport fiber characteristics of each of the optical link elements by analyzing propagation of an optical signal through a respective optical fiber of each of the optical links using a Volterra series transform function;
determining an expected performance metric for the optical link based on the linear OSNR, the non-linear OSNR, and a transmitter output OSNR;
designating the optical link as valid for use in the optical transport network based on determining that the expected performance metric is greater than or equal to a performance metric threshold; and
outputting the designation.

2. The method of claim 1, wherein analyzing the propagation of the optical signal through each of the respective optical fibers of each of the optical links includes decomposing, with the Volterra series transform function, a nonlinear Schrodinger equation describing the propagation.

3. The method of claim 1, wherein generating the nonlinear OSNR includes computing a first Volterra series run to compute a first nonlinear power spectral density based on a flat power profile, computing a second Volterra series run to compute a second nonlinear power spectral density based on the output power profile, and computing a power spectral density output based on a quotient of the second nonlinear power spectral density and the first nonlinear power spectral density.

4. The method of claim 1, wherein generating the nonlinear OSNR includes using a split-step Fourier propagator to perform a calibration run, and using a Volterra series propagator to compute the non-linear OSNR based on the calibration run.

5. The method of claim 1, wherein computing the fiber propagation effects include computing a power transfer between different frequencies of the optical signal resulting from self-Raman scattering, and computing a power loss caused by propagation through the optical fiber of each of the optical links.

6. The method of claim 1, wherein the set of operating parameters includes an amplifier type and a launch power value; the amplifier characteristics include a gain and a noise figure of the amplifier; and the transport fiber characteristics include attenuation as a function of frequency, Raman gain coefficient as a function of difference in frequency, chromatic dispersion, chromatic dispersion slope, and a nonlinear coefficient.

7. The method of claim 1, wherein the amplifier characteristic includes at least one reference Raman gain value for an input signal wavelength, wherein the reference Raman gain value is a function of fiber type, span unit loss, and pump point loss.

8. The method of claim 1, comprising calculating the set of operating parameters based on a span length and a unit loss of an optical link element.

9. The method of claim 1, comprising calculating the set of operating parameters by:
computing an effective OSNR for a plurality of potential design rule sets; and
selecting the potential design rule set associated with a highest effective OSNR.

10. The method of claim 1, wherein the expected performance metric includes an effective OSNR and the performance threshold metric includes a required OSNR.

11. The method of claim 10, wherein the effective OSNR includes an OSNR contributed by a transmitter, an OSNR contributed by an amplifier, an OSNR contributed by a receiver, and an OSNR contributed by a transmission impairment.

12. The method of claim 1, wherein the expected performance metric is a sum of inverses of the linear OSNR, the non-linear OSNR, a transmitter OSNR of a transmitter connected to the optical link, and a receiver OSNR of the receiver connected to the optical link.

13. A system for analyzing an optical network comprising at least one processor, which is configured to:
  generate a linear optical signal-to-noise ratio (OSNR) and an output power profile for each optical link element of an optical link based on an input power profile, amplifier characteristics, transport fiber characteristics, and a set of operating parameters associated with each of the optical link elements, wherein the output power profile represents the input power profile of an adjacent downstream optical link element of the optical link, and the linear OSNR is generated by:
    computing fiber propagation effects, and
    computing amplifier gain and noise figures;
  generate a nonlinear OSNR for each of the optical link elements based on the input power profile and transport fiber characteristics of each of the optical link elements by analyzing propagation of an optical signal through a respective optical fiber of each of the optical links using a Volterra series transform function;
  determine an expected performance metric for the optical link based on the linear OSNR, the non-linear OSNR, and a transmitter output OSNR;
  designate the optical link as valid for use in the optical transport network based on determining that the expected performance metric is greater than or equal to a performance metric threshold; and
  output the designation.

14. The system of claim 13, wherein the at least one processor analyzes the propagation of the optical signal through each of the respective optical fibers of each of the optical links by decomposing, with the Volterra series transform function, a nonlinear Schrodinger equation describing the propagation.

15. The system of claim 13, wherein the at least one processor computes two Volterra series runs by computing a first Volterra series run to compute a first nonlinear power spectral density based on a flat power profile, computing a second Volterra series run to compute a second nonlinear power spectral density based on the output power profile, and computing a power spectral density output based on a quotient of the second nonlinear power spectral density and the first nonlinear power spectral density.

16. The system of claim 13, wherein the at least one processor generates the non-linear OSNR by using a split-step Fourier propagator to perform a calibration run, and using a Volterra series propagator to compute the non-linear OSNR based on the calibration run.

17. The system of claim 13, wherein computing the fiber propagation effects include computing a power transfer between different frequencies of an optical signal resulting from self-Raman scattering, and computing a power loss caused by propagation through a optical fiber each optical link.

18. The system of claim 13, wherein the operating parameters include an amplifier type and a launch power value; the amplifier characteristics include a gain and a noise figure of the amplifier; and the transport fiber characteristics include attenuation as a function of frequency, Raman gain coefficient as a function of difference in frequency, chromatic dispersion, chromatic dispersion slope, and a nonlinear coefficient.

19. The system of claim 13, wherein the amplifier characteristics include at least one reference Raman gain value for several input signal wavelengths, wherein the reference Raman gain value is a function of fiber type, span unit loss, and pump point loss.

20. The system of claim 13, wherein the at least one processor calculates the set of operating parameters based on a span length and a unit loss of an optical link element.

21. The system of claim 13, wherein the at least one processor calculates the set of operating parameters by:
  computing an effective OSNR for a plurality of potential design rule sets; and
  selecting the potential design rule set associated with a highest effective OSNR.

22. The system of claim 13, wherein the expected performance metric includes an effective OSNR and the performance threshold metric includes a required OSNR.

23. The system of claim 22, wherein the effective OSNR includes an OSNR contributed by a transmitter, an OSNR contributed by an amplifier, an OSNR contributed by a receiver, and an OSNR contributed by a transmission impairment.

24. The system of claim 13, wherein the expected performance metric is a sum of inverses of the linear OSNR, the non-linear OSNR, a transmitter OSNR of a transmitter connected to the optical link, and a receiver OSNR of the receiver connected to the optical link.

* * * * *